(12) United States Patent
Jia et al.

(10) Patent No.: US 8,960,983 B2
(45) Date of Patent: Feb. 24, 2015

(54) PROFILED LIGHT GUIDE PLATE, BACKLIGHT MODULE AND LIQUID CRYSTAL DISPLACE DEVICE

(75) Inventors: Lili Jia, Beijing (CN); Xiuyun Chen, Beijing (CN); Ji Chen, Beijing (CN)

(73) Assignee: Beijing BOE Optoelectronics Technology Co., Ltd., Beijing (CN)

( * ) Notice: Subject to any disclaimer, the term of this patent is extended or adjusted under 35 U.S.C. 154(b) by 262 days.

(21) Appl. No.: 13/699,188

(22) PCT Filed: Aug. 24, 2012

(86) PCT No.: PCT/CN2012/080573
§ 371 (c)(1),
(2), (4) Date: Nov. 20, 2012

(87) PCT Pub. No.: WO2013/037263
PCT Pub. Date: Mar. 21, 2013

(65) Prior Publication Data
US 2014/0307467 A1    Oct. 16, 2014

(30) Foreign Application Priority Data

Sep. 16, 2011   (CN) .................. 2011 2 0348162 U

(51) Int. Cl.
*F21V 7/04*    (2006.01)
*F21V 8/00*    (2006.01)

(52) U.S. Cl.
CPC ...................... *G02B 6/003* (2013.01)
USPC ............ 362/607; 362/608; 362/611; 362/613

(58) Field of Classification Search
USPC .................. 362/607, 608, 611, 612
See application file for complete search history.

(56) References Cited

U.S. PATENT DOCUMENTS

| | | | | |
|---|---|---|---|---|
| 7,083,318 | B2* | 8/2006 | Ha et al. ......................... | 362/633 |
| 2006/0244877 | A1* | 11/2006 | Noh et al. ........................ | 349/64 |
| 2006/0269189 | A1 | 11/2006 | Seo | |
| 2008/0031010 | A1* | 2/2008 | Kim et al. ...................... | 362/612 |

(Continued)

FOREIGN PATENT DOCUMENTS

| CN | 1873505 A | 12/2006 |
|---|---|---|
| CN | 101874179 A | 10/2010 |

(Continued)

OTHER PUBLICATIONS

International Search Report mailed Dec. 6, 2012; PCT/CN2012/080573.

(Continued)

*Primary Examiner* — Ali Alavi
(74) *Attorney, Agent, or Firm* — Ladas & Parry LLP

(57) ABSTRACT

Embodiments of the present invention relate to a profiled light guide plate, a backlight module and a liquid crystal display device. In the profiled light guided plate according to the embodiments of the present invention, because the reflectivity of the profiled assembly is less than that of the light entry assembly, the emergent angle of the light beam entering into the profiled assembly from the light entry assembly is larger than the incident angle thereof, which causes the light beam entering from the light entry assembly into the profiled assembly to converge towards the central part of the profiled assembly, away from the ramp of the profiled assembly, thereby decreasing the amount of light leakage from the ramp.

9 Claims, 3 Drawing Sheets

(56) References Cited

U.S. PATENT DOCUMENTS

| | | |
|---|---|---|
| 2008/0043171 A1* | 2/2008 | Takahashi et al. .............. 349/65 |
| 2010/0328574 A1 | 12/2010 | Gourlay |
| 2012/0002441 A1 | 1/2012 | Yabe et al. |

FOREIGN PATENT DOCUMENTS

| | | |
|---|---|---|
| CN | 102105737 A | 6/2011 |
| CN | 102121639 A | 7/2011 |
| CN | 202196197 A | 4/2012 |
| JP | 2000-249837 A | 9/2000 |

OTHER PUBLICATIONS

International Preliminary Report on Patentability dated Mar. 18, 2014; PCT/CN2012/080573.

\* cited by examiner

PROFILED LIGHT GUIDE PLATE, BACKLIGHT MODULE AND LIQUID CRYSTAL DISPLACE DEVICE

TECHNICAL FIELD

Embodiments of the present invention relate to a profiled light guide plate, a backlight module and a liquid crystal display device.

BACKGROUND

Light guide plates are devices to convert a point light source/line light source into a plane light source, and widely used in backlight modules of LCD displays. A light guide plate typically employs optical grade acryl (PMMA) or optical PC (polycarbonate) as a base material, may be of various shapes including a circular shape, a elliptical shape, an arc shape and a triangle shape, and have advantages such as ultra-thin profile, ultra-brightness, homogeneous light guiding and energy saving.

In conventional electronic devices comprising LCD displays, typically a light guide plate of the planar structure as shown in FIG. 1 is used, with a light source 12 provided on one side thereof. As the electronic devices comprising LCD displays become lighter and thinner continuously, the shape of the light entry side of the light guide plate is also becoming more irregular. A profiled light guide plate 21 is shown in FIG. 2, different from the planar light guide plate 11 in that: the profiled light guide plate 21 comprises a ramp X towards the position of the light source 22 (i.e., the light entry side), and the light guide plate extending from one side of the ramp X is tapered; however, there occur at least problems as described later during application of the profiled light guide plate.

An optical path of the light beam in the profiled light guide plate 31 with the ramp X is shown in FIG. 3. Under the illumination of the light source 32, the light beam R31 that would have been capable of being fully reflected in the planar light guide plate (the reflected light beam R32 represented by the dash line is the reflected light beam in case of being fully reflected in the planar light guide plate shown by the dash line) may not be fully reflected due to the ramp X, and is refracted at the ramp X, forming a refracted light beam R33 represented by the solid line. This leads to a large amount of light leakage from the ramp X, forming bright lines at such ramp X. The picture quality of the LCD display comprising such profiled light guide plate is since worsened, failing to meet the needs of the consumers.

SUMMARY

A profiled light guide plate, a backlight module and a liquid crystal display device capable of significantly decreasing the amount of light leaked from a ramp of the profiled light guided plate are disclosed by the embodiments of the present invention.

A profiled light guide plate is provided according to one embodiment of the present invention, comprising a light entry assembly with a first refractivity, a profiled assembly with a second refractivity lower than the first refractivity, and a planar assembly, wherein the light entry assembly, the profiled assembly and the planar assembly are joined in series. The profiled assembly comprises a ramp extending from the top face of the light entry assembly to the top face of the planar assembly having a lower thickness than the light entry assembly; the light entry assembly comprises a light entry surface in a plane and an side surface opposite thereto forming a first adjoining interface by joining with the profiled assembly, and the first adjoining interface is a curved face protruding towards the profiled assembly; and a second adjoining interface is formed by joining the side surface of the profiled assembly opposite to the first adjoining interface with the planar assembly.

A backlight module comprising the above described light guide plate and a light source provided on the light entry side of the profiled light guide plate is disclosed by another embodiment of the present invention.

A liquid crystal display comprising the above described backlight module is disclosed by a further embodiment of the present invention.

In the profiled light guide plate, the backlight module and the liquid crystal display device according to the embodiments of the present invention, because the reflectivity of the profiled assembly is less than that of the light entry assembly, the incident angle of the light entering into the profiled assembly from the light entry assembly is larger than the emergent angle; furthermore, because the adjoining interface between the light entry assembly and the profiled assembly is a curved face protruding towards the profiled assembly, the light entering into the profiled assembly from the light entry assembly converges towards the center of the assembly and therefore travels away from the ramp of the profiled assembly, and accordingly the amount of light leakage from the ramp is decreased.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION OF THE PREFERRED EMBODIMENTS

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

A profiled light guide plate is provided according to one embodiment of the present invention, comprising a light entry assembly with a first refractivity, a profiled assembly with a second refractivity lower than the first refractivity, and a planar assembly. wherein the light entry assembly, the profiled assembly and the planar assembly are joined in series; the profiled assembly comprises a ramp extending from the top face of the light entry assembly to the top face of the planar assembly, with the thickness of the planar assembly being lower than that of the light entry assembly. For example, the light entry surface of one side of the light entry assembly may be a plane such that the side surface opposite to the light entry surface forms a first adjoining interface by joining with the profiled assembly. Furthermore, for example, the first adjoining face may be a curved face protruding towards the profiled assembly. For example, a second adjoining interface is formed by joining the side surface of the profiled assembly opposite to the first adjoining interface with the planar assembly. For example, the bottom faces of the light entry assembly, the profiled assembly and the planar assembly are on a same level.

A backlight module comprising the above described light guide plate is provided according to another embodiment of the present invention.

A liquid crystal display comprising the above described backlight module is provided according to a further embodiment of the present invention.

In the profiled light guide plate, the backlight module and the liquid crystal display device according to the embodiments of the present invention, due to the higher refractivity of the light entry assembly than that of the profiled assembly, the incident angle of the light entering into the profiled assembly from the light entry assembly is larger than the emergent angle; furthermore, because the adjoining interface between the light entry assembly and the profiled assembly is a curved face protruding towards the profiled assembly, the light entering into the profiled assembly from the light entry assembly converges towards the center of the assembly, and therefore travels away from the ramp of the profiled assembly, and thus the amount of light leakage from the ramp is decreased.

Figure 1:
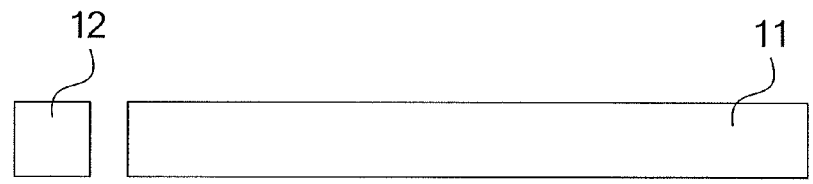
FIG. 1 is a side view of a conventional planar light guide plate.
Figure 2:
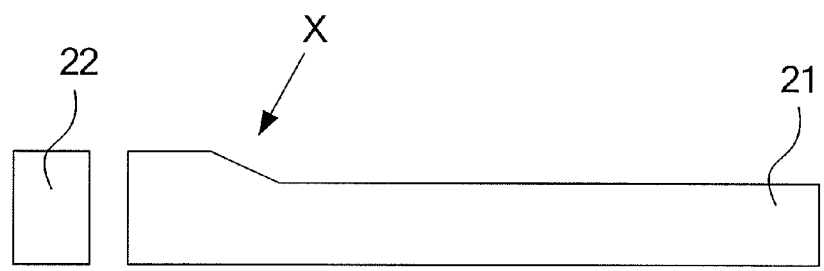
FIG. 2 is a side view of a conventional profiled light guide plate.
Figure 3:
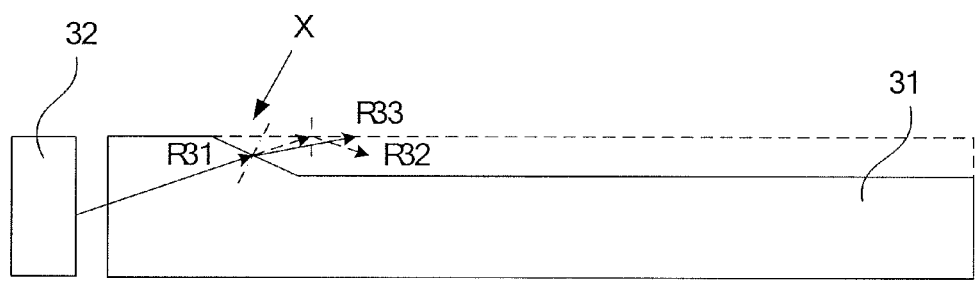
FIG. 3 is an analytical view of the light beam in the profiled light guide plate of FIG. 2.
Figure 4:
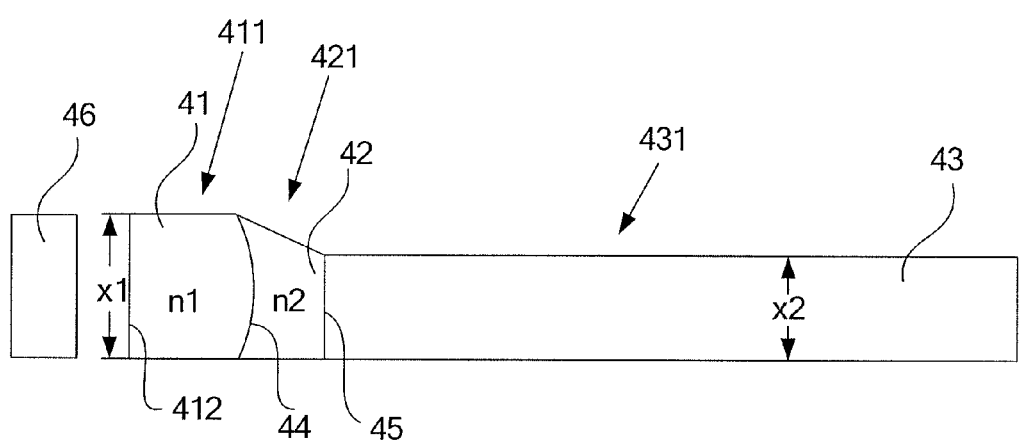
FIG. 4 is a side view of the profiled light guide plate according to the embodiments of the present invention.

The profiled light guide 400 is provided according to an embodiment of the present invention. As shown in FIG. 4, the profile of the profiled light guide plate is the one that includes a ramp 421. The profiled light guide plate 400 according to the embodiment of the present invention comprises a light entry assembly 41 with a first refractivity n1, a profiled assembly with a second refractivity n2 lower than the first refractivity n1 (i.e., n2<n1), and a planar assembly 43, which are joined in series to form the profiled light guide plate. The joining may be realized by various methods such as gluing. The profiled assembly 42 comprises a ramp 421 extending from the top face 411 of the light entry assembly 41 to the top face 431 of the planar assembly 43. The thickness x2 of the planar assembly 43 is less than the thickness x1 of the light entry assembly 41.

The light entry surface 412 (namely the side surface close to the light source 46) of the light entry assembly is in a plane, and the side surface opposite to the light entry surface 412 form a first adjoining interface 44 by joining with the profiled assembly 42; the first adjoining interface 44 is a curved face protruding towards the profiled assembly. The curved face for example is spherical or may be any other curved face with a light convergence capability.

The side surface of the profiled assembly 42 opposite to the first adjoining interface 44 joins with the planar assembly 43 to form a second adjoining interface 45, and the profiled assembly 42 and the planar assembly 43 each has a profile fit to each other at the second adjoining interface 45.

In the example as shown in the drawings, the bottom faces of the light entry assembly 41, the profiled assembly 42 and the planar assembly 43 are on a same level. However, the bottom faces of the light entry assembly 41, the profiled assembly 42 and the planar assembly 43 may not be on a same level; for example, the profiled assembly 42 may comprises another ramp on the bottom face.

Figure 5:
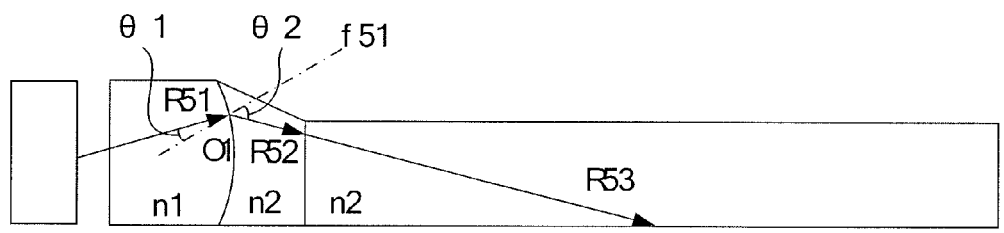
FIG. 5 is an analytical view of the light beam in the profiled light guide plate of FIG. 4.

An optical path in the above described profiled light guide plate is shown in FIG. 5. For example, the light beam R51 is emitted from the light source and enters into the light entry assembly from the light entry surface thereof, with the light beam R51 being of the type of the light beams that may leak from the ramp by refracting at the ramp in conventional profiled light guide plates. In the present embodiment, the light beam R51 is refracted at the first adjoining interface between the light entry assembly and the profiled assembly, because the refractivity n2 of the profiled assembly is lower than the refractivity n2 of the light entry assembly, according to the refractivity equation n1·sin θ1=n2·sin θ2, the emergent angle θ2 of the refracted light beam R52 upon entering of the light beam R51 into the profiled assembly may be larger than the emergent angle θ1 of the light beam R51 at the first adjoining interface. Furthermore, because the curved face of the first adjoining interface protrudes towards the profiled assembly, the normal f51 of the first adjoining face at the incident point O1 of the light beam R51 is deflected counter-clockwisely with respect to the incident direction of the light beam R51, and accordingly the refracted light beam R52 is deflected clockwisely with respect to the normal f51. In other words, the light beam R52 further converges towards the center of the profiled assembly, away from the ramp, thereby decreasing the amount of light leakage from the ramp.

Of course, the curvature of the first adjoining interface may be adjusted based on the specific dimensions of the light entry assembly and the profiled assembly, as well as the requirements on the light leak amount on the ramp, so as to minimize the amount of light leakage from the ramp.

As shown in FIG. 5, the angle between the refracted light beam R52 after convergence and the horizontal direction is relatively small; assuming that the refractivity of the profiled assembly is identical to that of the planar assembly, when the refracted light beam R52 enters from the profiled assembly into the planar assembly, the emergent angle is identical to the incident angle, thus the light beam R53 in the planar assembly formed by the refracted light beam R52 reaches the bottom face or the top face of the planar assembly after traveling a longer distance. In other words, the light beam from the light source may reach further positions on the surface of the planar assembly from the second adjoining interface after convergence at the first adjoining interface, thereby decreasing the light beam reaching the position on the surface of the planar assembly closer to the second adjoining interface, which renders an inhomogeneous illumination at the top face of the planar assembly.

Figure 6:
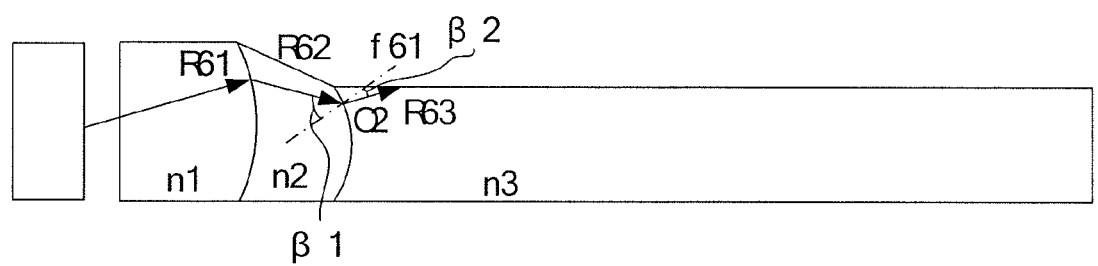
FIG. 6 is an analytical view of the light beam in another profiled light guide plate according to the embodiments of the present invention.

However, the inhomogeneous illumination may be significantly alleviated by manipulating the profile of the second adjoining interface and the refractivity of the planar assembly. In a profiled light guide plate 500 according to another embodiment as shown in FIG. 6, the second adjoining interface is a curved face protruding towards the planar assembly, with the refractivity n3 of the planar assembly larger than the refractivity n2 of the profiled assembly (namely n2<n3). For example, the curved face may be spherical or any other proper curved face; or the second adjoining interface may be for example an irregular face with a convex-concave structure, to improve the light distribution.

The light beam R61 forms a refracted light beam R62 upon entering into the profiled assembly from the light entry assembly, the refracted light beam R62 may travel away from the ramp and enter into the planar assembly at the incidence point 02, farming a light beam R63. Because the second adjoining interface is a curved face protruding towards the planar assembly, the normal f61 of the second adjoining interface at the incident point 02 of the refracted light beam R62 is deflected counterclockwisely with respect to the incident direction of the refracted light beam R62, and accordingly deflecting the light beam R63 clockwisely with respect to the normal f51. In addition, due to the fact that the refractivity n2 of the profiled assembly is lower than the refractivity n3 of the planar assembly, according to the refractivity equation $n2 \cdot \sin \beta 1 = n3 \cdot \sin \beta 2$, the emergent angle $\beta 2$ of light beam R63 may be lower than the incident angle $\beta 1$ of the refracted light beam R62 at the second adjoining interface, thereby making the light beam R63 capable of reaching a point on the surface of the planar assembly closer to the second adjoining interface, thus alleviating the inhomogeneous illumination on the face of the planar assembly.

Of course, the second adjoining interface may be not limited to the curved face protruding towards the planar assembly as shown in FIG. 6, and may be a curved face protruding towards the profiled assembly, in which case, the light beam entering into the planar assembly from the profiled assembly may be diverged by choosing a proper refractivity of the planar assembly, to alleviating the inhomogeneous illumination on the face of the planar assembly.

The embodiments of the present invention preferably employ PC (polycarbonate) as the base material for the light entry assembly and the planar assembly, and PMMA (optical grade acryl) as the base material for the profiled assembly (the refractivity of PC is larger than the refractivity of PMMA). The present invention may be realized by choosing any appropriate base material for the light entry assembly and the profiled assembly, as long as the refractivity of the light entry assembly being larger than that of the profiled assembly.

A backlight module is also provided according to the embodiments of the present invention, comprising a light guide plate as described above, capable of avoiding generating bright lines at the position corresponding to the profiled light guide plate. A light source is also provided on the light entry side of the profiled light guide plate, such as a light-emitting diode (LED) as a point light source or a cold cathode fluorescent light (CCFL) as a line light source.

A liquid crystal display device comprising a liquid crystal display panel and the above described backlight module is also provided according to the embodiments of the present invention, and can improve display quality and meet the needs from consumers. The backlight module is provided on the backside of the liquid display panel to provide light for display.

The embodiments of the present invention are mainly used in the backlight modules of the display devices.

Those described above merely serves as the embodiments of the present invention, without limiting the protection scope of the present invention, and the protection scope of the invention should be defined by the appended claims.

The invention claimed is:

1. A profiled light guide plate, comprising:
   a light entry assembly with a first refractivity, a profiled assembly with a second refractivity lower than the first refractivity, and a planar assembly,
   wherein the light entry assembly, the profiled assembly and the planar assembly are joined in series;
   wherein the profiled assembly comprises a ramp extending from a top face of the light entry assembly to a top face of the planar assembly, and a thickness of the planar assembly is less than that of the light entry assembly;
   the light entry assembly comprises a light entry surface in a plane and an side surface opposite thereto forming a first adjoining interface by joining with the profiled assembly, and the first adjoining interface is a curved face protruding towards the profiled assembly; and
   a second adjoining interface is formed by joining the side surface of the profiled assembly opposite to the first adjoining interface with the planar assembly.

2. A profiled light guide plate according to claim 1, wherein the planar assembly has a third refractivity larger than the second refractivity.

3. A profiled light guide plate according to claim 2, wherein the second adjoining interface is a curved face protruding towards the planar assembly.

4. A profiled light guide plate according to claim 1, wherein bottom faces of the light entry assembly, the profiled assembly and the planar assembly are on a same level.

5. A profiled light guide plate according to claim 2, wherein the bottom faces of the light entry assembly, the profiled assembly and the planar assembly are on a same level.

6. A profiled light guide plate according to claim 3, wherein the bottom faces of the light entry assembly, the profiled assembly and the planar assembly are on a same level.

7. A backlight module, comprising a profiled light guide plate according to claim 1, and a light source provided on an entry side of the profiled light guide plate.

8. A backlight module according to claim 7, wherein the light source is a point light source or a line light source.

9. A liquid crystal display device, comprising a backlight module according to claim 7.

* * * * *